United States Patent

Jenkins et al.

[11] Patent Number: 5,533,745
[45] Date of Patent: Jul. 9, 1996

[54] AIR BAG MODULE

[75] Inventors: Jeffrey A. Jenkins, Shelby Township; John W. Wiers, Romeo, both of Mich.

[73] Assignee: TRW Vehicle Safety Systems Inc., Lyndhurst, Ohio

[21] Appl. No.: 370,788

[22] Filed: Jan. 10, 1995

[51] Int. Cl.⁶ .................................................. B60R 21/16
[52] U.S. Cl. ................................. 280/728.2; 280/732
[58] Field of Search ............................... 280/728.2, 732, 280/741

[56] References Cited

U.S. PATENT DOCUMENTS

| | | | |
|---|---|---|---|
| 4,915,410 | 4/1990 | Bachelder | 280/732 |
| 5,058,919 | 10/1991 | Paquette et al. | 280/732 |
| 5,186,492 | 2/1993 | Wright et al. | 280/732 |
| 5,209,519 | 5/1993 | Shiga et al. | 280/728.2 |
| 5,290,059 | 3/1994 | Smith et al. | 280/728.2 |
| 5,326,131 | 7/1994 | Yokota et al. | 280/728.2 |
| 5,332,256 | 7/1994 | Lauritzen et al. | 280/728.2 |
| 5,405,164 | 4/1995 | Paxton et al. | 280/728.2 |

*Primary Examiner*—Kenneth R. Rice
*Attorney, Agent, or Firm*—Tarolli, Sundheim, Covell, Tummino & Szabo

[57] ABSTRACT

An air bag module (10) includes a housing (12) having upper and lower side walls (30, 38) and a central wall (50). An air bag (14) is folded and stored in the housing (12). An inflator (16) is disposed in the housing (12) between the air bag (14) and the central wall (50). A spring clip (20) is disposed between the air bag (14) and the inflator (16). The spring clip (20) has end portions (150, 152) connected with the upper and lower side walls (30, 38) of the housing (12). A central portion (148) of the spring clip (20) biases and holds the inflator (16) against the central wall (50) of the housing.

19 Claims, 3 Drawing Sheets

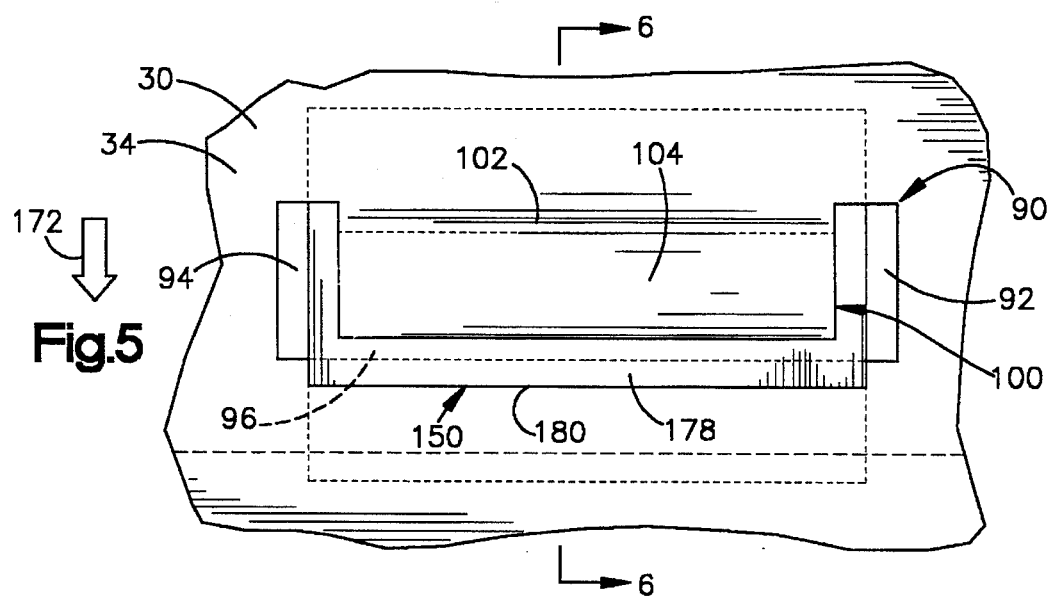
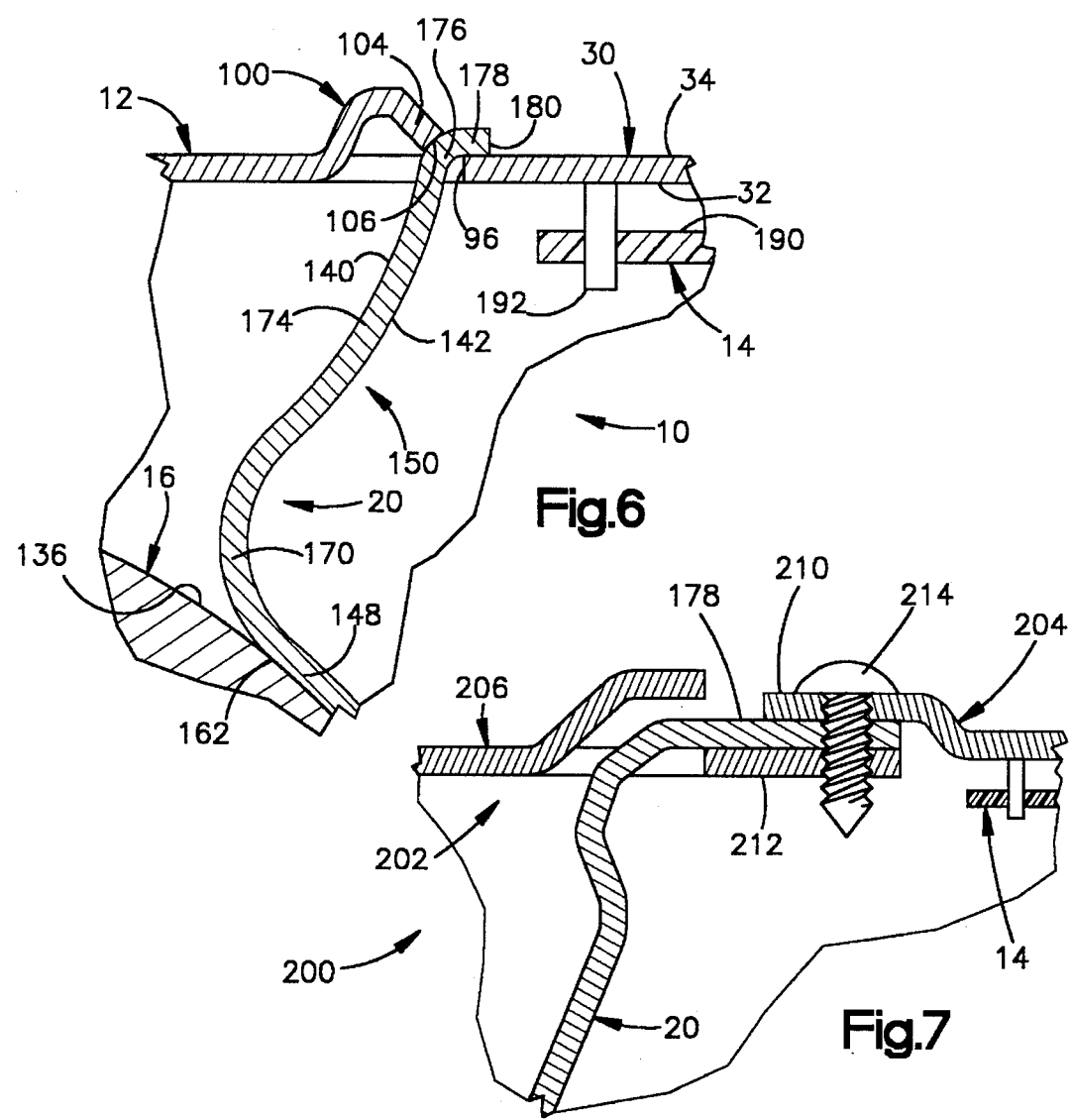

5,533,745

AIR BAG MODULE

BACKGROUND OF THE INVENTION

1. Technical Field

The present invention relates to a vehicle safety apparatus, and particularly relates to an air bag module including means for securing an inflator in a housing.

2. Description of the Prior Art

It is known to protect a vehicle occupant in the event of a vehicle collision by inflating an air bag to restrain the vehicle occupant. The air bag is inflated by inflation fluid from an air bag inflator that is contained in a housing with the air bag. In some air bag modules, a retainer connected with the housing engages the inflator at a location on the side of the inflator opposite the air bag. When so located, the retainer is accessible from the outside of the housing.

SUMMARY OF THE INVENTION

The present invention is a vehicle safety apparatus comprising a housing having a plurality of walls defining a chamber in the housing. The plurality of walls includes first and second opposite side walls and a central wall extending between and interconnecting the first and second side walls. The first and second side walls have portions at least partially defining a deployment opening in the housing opposite the central wall. An inflatable vehicle occupant restraint is stored in the chamber in the housing between the central wall and the deployment opening. An inflator is positioned in the housing at a location between the inflatable restraint and the central wall. A spring clip is disposed within the housing at a location between the inflator and the inflatable restraint. The spring clip has a first end portion connected with the upper side wall of the housing, a second end portion connected with the second side wall of the housing, and a central portion in abutting engagement with the inflator. The spring clip biases and holds the inflator against the central wall of the housing.

BRIEF DESCRIPTION OF THE DRAWINGS

Further features of the present invention will become apparent to those skilled in the art to which the present invention relates from reading the following specification with reference to the accompanying drawings, in which:

FIG. 5 is an enlarged view of a portion of FIG. 1;

FIG. 6 is a view similar to FIG. 4 showing a later stage in the assembly of the vehicle safety apparatus of FIG. 1; and FIG. 7 is a view similar to FIG. 6 of a portion of a vehicle safety apparatus which is constructed in accordance with a second embodiment of the present invention.

DESCRIPTION OF PREFERRED EMBODIMENTS

Figure 1:
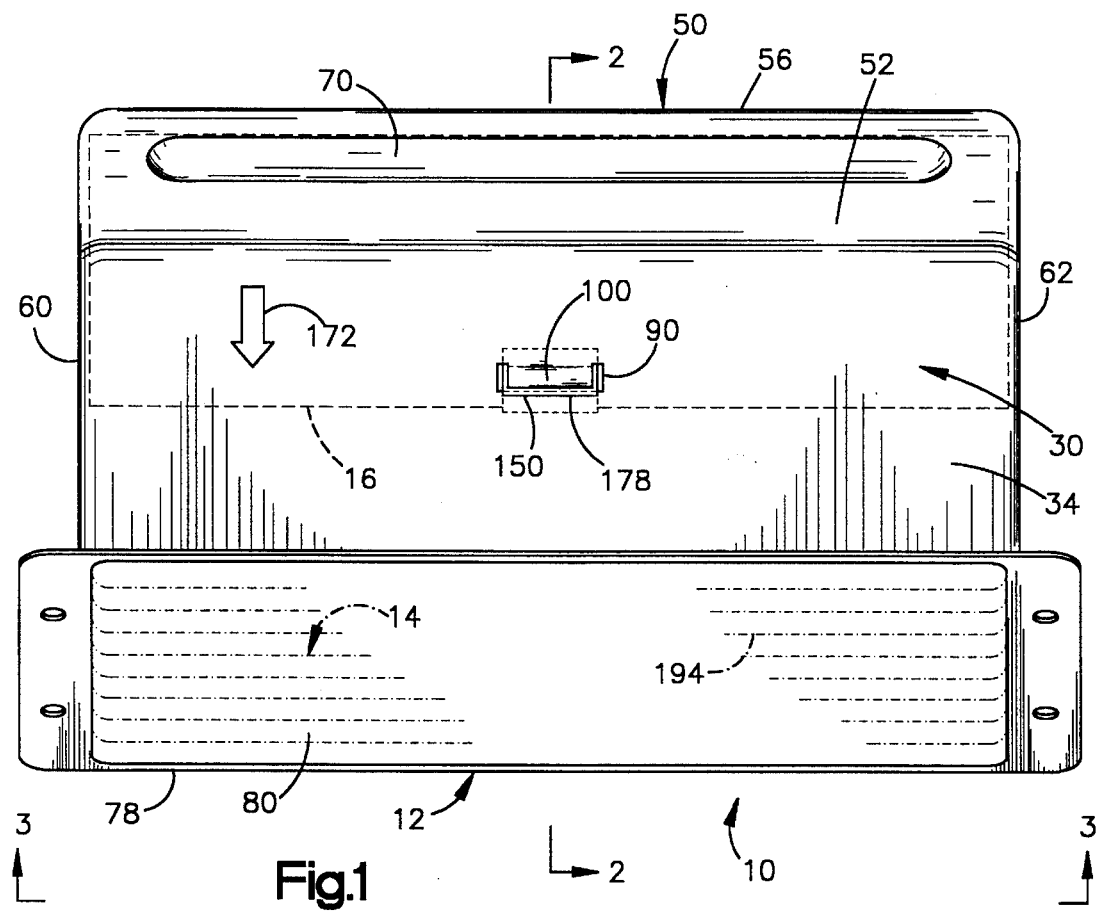
FIG. 1 is a top plan view of a vehicle safety apparatus embodying the present invention.
Figure 2:
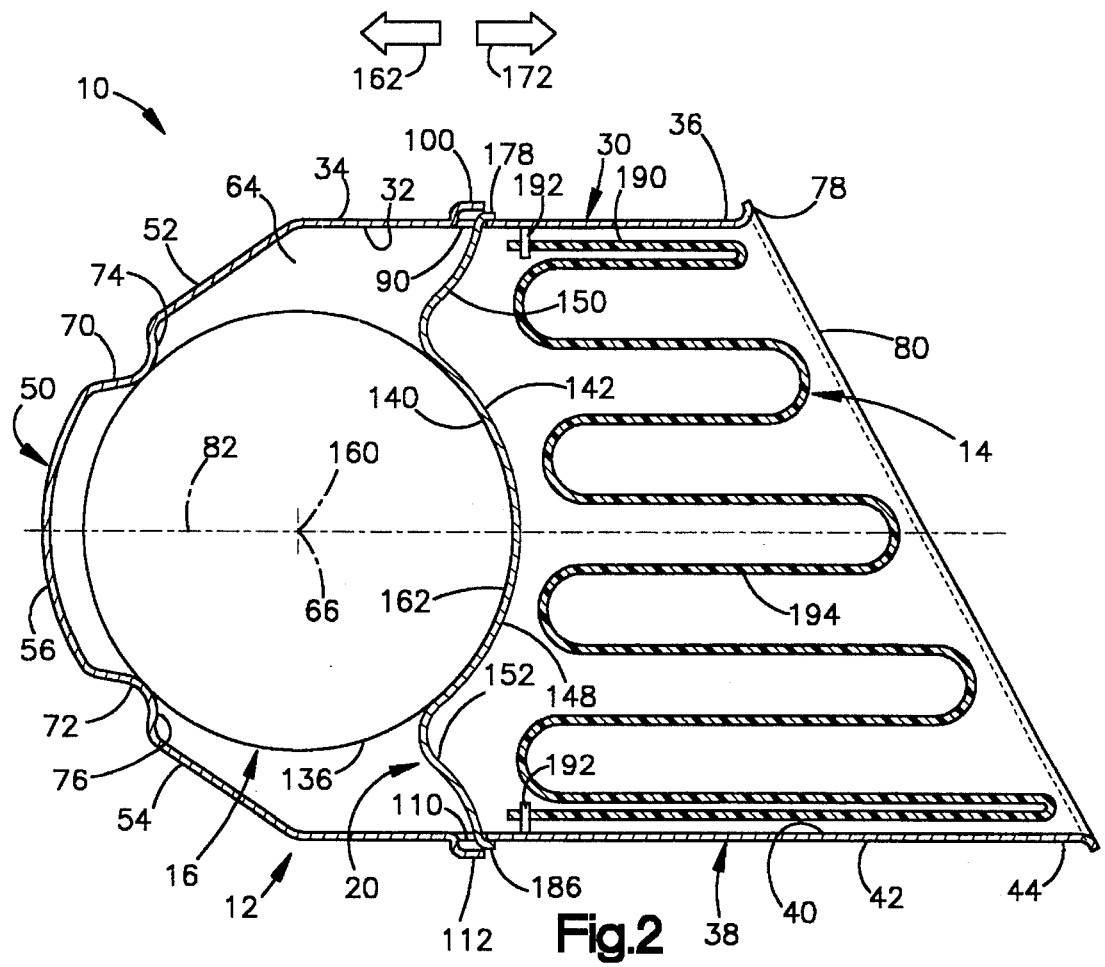
FIG. 2 is a sectional view taken along line 2—2 of FIG. 1.

The present invention relates to a vehicle safety apparatus, and particularly relates to a vehicle safety apparatus including an inflatable vehicle occupant restraint which is inflated to protect an occupant of a vehicle in the event of a vehicle collision. The present invention is applicable to various vehicle safety apparatus constructions. As representative of the present invention, FIG. 1 illustrates a vehicle safety apparatus comprising an air bag module 10. The air bag module 10 includes a housing 12 and an air bag 14. The air bag module 10 also includes an inflation fluid source or inflator 16 and a spring clip 20 (FIG. 2).

The housing 12 (FIGS. 1 and 2) is made of sheet metal and includes a generally planar upper side wall 30 having an inner major side surface 32 and an outer major side surface 34. The upper side wall 30 has a rear edge portion 36. A generally planar lower side wall 38 is spaced from and extends parallel to the upper side wall 30. The lower side wall 38 has an inner major side surface 40 and an outer major side surface 42. The inner side surface 40 of the lower side wall 38 faces the inner side surface 32 of the upper side wall 30. The lower side wall 38 has a rear edge portion 44.

The housing 12 further includes a central wall 50 extending between and interconnecting the upper side wall 30 and the lower side wall 38 to form a C-shaped cross-sectional configuration for the housing. The central wall 50 includes a planar upper portion 52 and a planar lower portion 54 which are interconnected by an arcuate intermediate portion 56. Opposed parallel first and second end walls 60 and 62 (FIG. 1) of the housing 12 extend perpendicular to the upper and lower side walls 30 and 38 at opposite ends of the C-shaped configuration. Each end wall 60 and 62 has a generally planar configuration. The housing walls 30, 38, 50, 60 and 62 define a chamber 64 in the housing 12.

Figure 3:
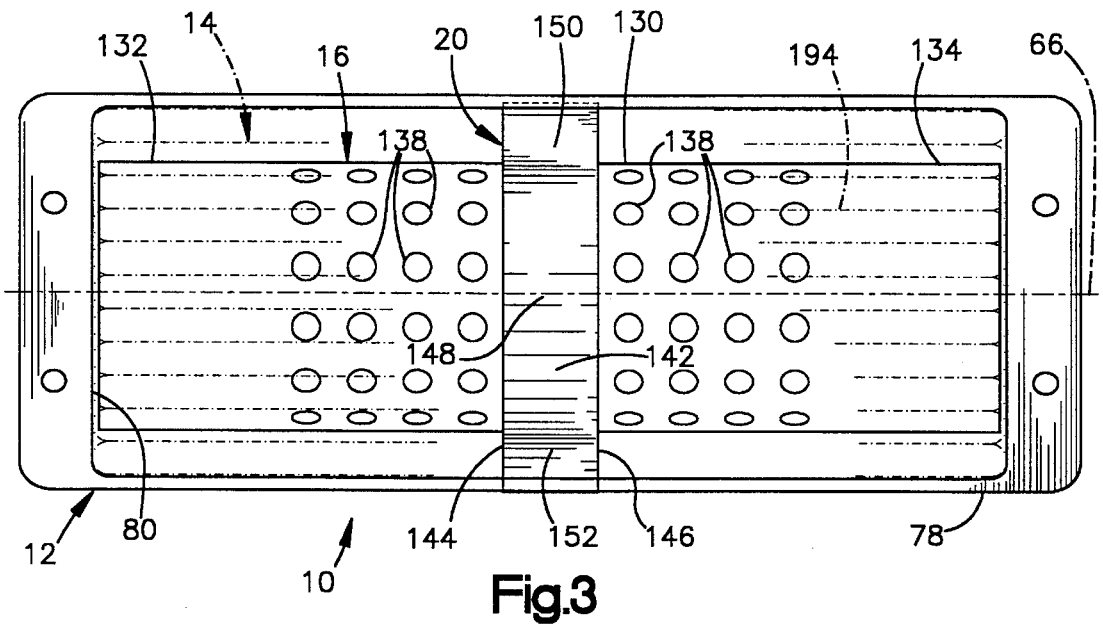
FIG. 3 is an elevational view taken along line 3—3 of FIG. 1.

A transverse axis 66 (FIG. 3) of the air bag module 10 extends longitudinally between the end walls 60 and 62. In the illustrated embodiment, the transverse axis 66 is disposed parallel to the upper and lower side walls 30 and 38 of the housing 12. A pair of ribs 70 and 72 project inwardly from the central wall 50 and extend in a direction parallel to the transverse axis. The ribs 70 and 72 are formed as arcuate indentations in the central wall 50. The upper rib 70 has an arcuate inner side surface 74. The lower rib 72 has an arcuate inner side surface 76.

The housing 12 includes a mounting flange 78 for securing the housing to a portion of the vehicle, such as the instrument panel, in any known manner. The mounting flange 78 is formed as a part of the rear edge portions of the walls 30, 38, 60 and 62 of the housing 12 and defines a deployment opening 80 in the housing opposite the central wall 50.

A front-to-rear axis 82 (FIG. 2) of the air bag module 10 extends between the central wall 50 and the deployment opening 80. The front-to-rear axis 82 extends perpendicular to the transverse axis 66. In the illustrated embodiment, the front-to-rear axis 82 is disposed parallel to the upper and lower side walls 30 and 38 of the housing 12 and also parallel to the end walls 60 and 62 of the housing.

A U-shaped slot 90 (FIGS. 1, 2 and 5) is formed in the upper side wall 30 of the housing 12 at a location intermediate the central wall 50 and the mounting flange 78. The slot 90 is formed by cutting away a U-shaped segment of the material of the upper side wall 30. The slot 90 has two side portions 92 and 94 extending in a front-to-rear direction and a base portion 96 extending between and interconnecting the side portions.

The slot 90 defines a tab 100 in the upper side wall 30 of the housing 12. The tab 100 comprises material of the upper side wall 30 which is deformed outward from the plane of the upper side wall. The tab 100 has a first portion 102 which extends transverse to the plane of the upper side wall 30. A second portion 104 of the tab 100 extends generally perpendicular to the first portion 102 and parallel to the plane of the upper side wall 30. The second portion 104 of the tab 100 has a rear edge surface 106.

A U-shaped slot 110 (FIG. 2) is formed in the lower side wall 38 of the housing 12 at a location intermediate the central wall 50 and the mounting flange 78. The slot 110 in the lower side wall 38 is a mirror image of the slot 90 in the upper side wall 30. The slot 110 defines a tab 112 in the lower side wall 38 of the housing 12. The tab 112 is a mirror image of the tab 100 in the upper side wall 30. The tab 112 comprises material of the lower side wall 38 which is deformed outward from the plane of the lower side wall.

The inflator 16 (FIGS. 1 and 3) is a known inflator having an elongate cylindrical shape including a central portion 130 and first and second opposite axial end portions 132 and 134. The inflator 16 has a longitudinal central axis which is coincident with the transverse axis 66 of the air bag module 10. A cylindrical outer surface 136 (FIG. 2) of the inflator 16 extends between the end portions 132 and 134 of the inflator. A plurality of fluid outlets 138 in the inflator 16 enable flow of inflation fluid, upon actuation of the inflator, into the chamber 64 in the housing 12 to inflate the air bag 14.

The spring clip 20 (FIGS. 2–6), in the preferred embodiment, is a single piece or strip of spring steel. The spring clip 20 could alternatively be made from other materials. The spring clip 20 has parallel front and rear major side surfaces 140 and 142 and parallel opposite minor side surfaces 144 and 146 (FIG. 3) that extend between the major side surfaces 140 and 142. The spring clip 20 is symmetrical about the front-to-rear axis 82 of the air bag module 10. Thus, the portion of the spring clip 20 disposed above (as viewed in FIG. 2) the front-to-rear axis 82 is a mirror image of the portion of the spring clip below (as viewed in FIG. 2) the front-to-rear axis.

The spring clip 20 has a central portion 148 which is centered on the front-to-rear axis 82 and which extends both above and below the front-to-rear axis. The central portion 148 of the spring clip 20 has an arcuate configuration with a center of curvature 160 (FIG. 2) disposed on the longitudinal central axis of the inflator 16. The center of curvature 160 of the central portion 148 of the spring clip 20 is located forward of the central portion of the spring clip, that is, in the direction indicated by the arrow 162. The front major side surface 140 of the spring clip 20 includes a cylindrical portion 162 which is formed on the central portion 148 and which is presented toward the inflator 16.

An upper end portion 150 of the spring clip 20 extends from the central portion 148 of the spring clip in a direction generally radially outward from the center of curvature 160 of the central portion. The upper end portion 150 includes a first curved section 170 (FIG. 4) which has a center of curvature located to the rear of the first curved section, that is, in the direction indicated by the arrow 172. A second curved section 174 extends outward from the first section 170 and has a center of curvature located forward of the second curved section, that is, in the direction indicated by the arrow 162. A third curved section 176 extends outward from the second section 174 and has a center of curvature located generally rearward of the third curved section.

A planar terminal section 178 of the upper end portion 150 of the spring clip 20 extends to the rear of the third curved section 176 in the direction 172. The terminal section 178 has a planar end surface 180.

A lower end portion 152 of the spring clip 20 is a mirror image of the upper end portion 150. The lower end portion 152 of the spring clip 20 extends from the central portion 148 of the spring clip in a direction generally radially outward from the center of curvature 160 of the central portion. The lower end portion 152 includes a terminal section 186 which extends generally rearward, that is, in the direction indicated by the arrow 172.

The air bag module 10 also includes a cover (not shown) which extends across and closes the deployment opening 80. The cover is preferably made from a plastic material such as the material of the vehicle instrument panel. The cover protects and conceals the air bag 14 when the air bag module 10 is mounted in the vehicle instrument panel.

To assemble the air bag module 10, the inflator 16 is first moved through the deployment opening 80 to a position in the chamber 64 in the housing 12 as shown in FIG. 2. The ribs 70 and 72 on the central wall 50 of the housing 12 hold the inflator 16 in a position spaced apart from the intermediate portion 56 of the central wall of the housing. The spring clip 20 is then inserted through the deployment opening 80 into the chamber 64 in the housing 12. The upper and lower end portions 150 and 152 of the spring clip 20 engage the upper and lower side walls 30 and 38 of the housing 12 and are resiliently deflected inward in a direction toward the front-to-rear axis 82 of the air bag module 10 and away from the central wall 50 of the housing 12. This deflection occurs because the distance between the terminal sections 178 and 186 of the spring clip 20, when the spring clip is in a free or undeflected condition, is greater than the distance between the upper and lower side walls 30 and 38 of the housing 12.

Figure 4:
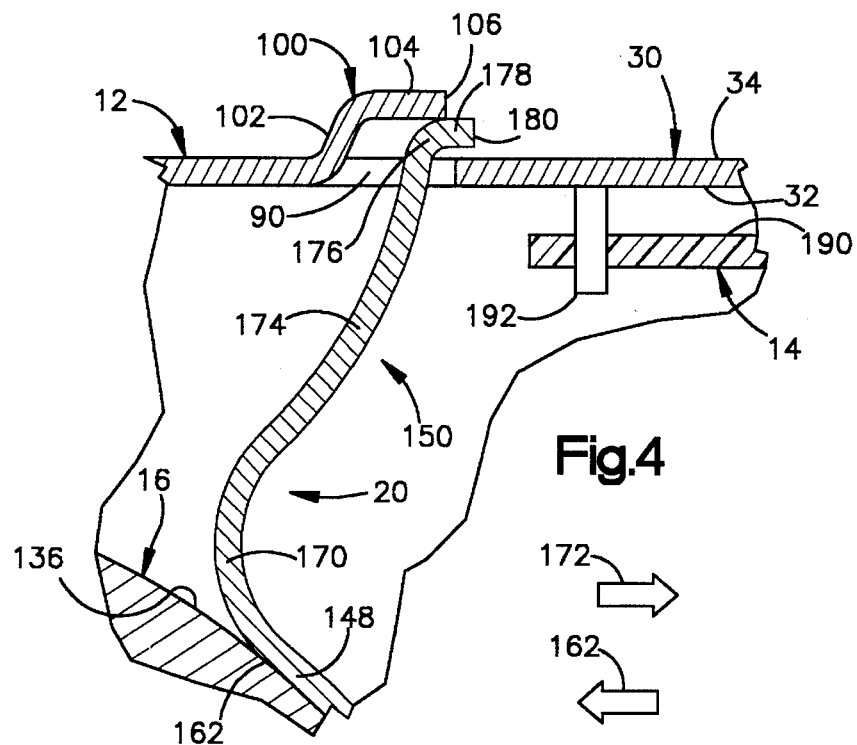
FIG. 4 is an enlarged view of a portion of FIG. 2 showing one stage in the assembly of the vehicle safety apparatus of FIG. 1.

The spring clip 20 is moved relative to the housing 12 until the terminal section 178 of the upper end portion 150 of the spring clip 20 reaches the slot 90. The resilience of the spring clip 20 causes the terminal section 178 to spring outward through the slot 90 from the chamber 64 to the exterior of the housing 12. The terminal section 178 engages the tab 100 on the upper wall 30 of the housing 12. The tab 100 limits the outward movement of the terminal section 178. The terminal section 178 is resiliently deflected in a direction away from the central wall 50 of the housing 12 and toward the front-to-rear axis 82 of the air bag module 10. This position of the spring clip 20 is illustrated in FIGS. 2 and 4.

The lower end portion 152 of the spring clip 20 moves relative to the lower wall 38 of the housing 12 until the terminal section 186 reaches the slot 110 in the lower wall. The resilience of the spring clip 20 causes the terminal section 186 to spring outward through the slot 110 from the chamber 64 to the exterior of the housing 12. The terminal section 186 of the lower end portion 152 engages the tab 112 on the lower wall 38 of the housing 12. The tab 112 limits the outward movement of the end portion 152. Thus, the end portion 152 of the spring clip 20 is in a condition deflected in the direction 172 away from the central wall 50 of the housing 12 and toward the front-to-rear axis 82 of the air bag module 10. This position of the spring clip 20 is shown in FIG. 20

The tabs 100 and 112 on the housing 12 are preferably bent down against the terminal sections 178 and 186 of the spring clip 20, to secure the spring clip in the housing. Specifically, the tab 100 is bent from a condition shown in FIG. 4 to a condition shown in FIG. 60 The rear edge surface 106 of the tab 100 clamps the terminal section 178 of the spring clip 20 against the edge portion of the upper wall 30 which defines the base portion 96 of the slot 90. In a similar manner, the rear edge surface of the tab 112 clamps the terminal section 186 of the spring clip 20 against the edge portion of the lower wall 38 of the housing 12 which defines the base portion of the slot 110.

The dimensions of the spring clip 20 are selected so that when the end portions 150 and 152 of the spring clip extend through the slots 90 and 110, respectively, as shown in FIG. 2, the central portion 148 of the spring clip is in engagement with and wraps around the inflator 16. The cylindrical surface portion 162 of the central portion 148 of the spring clip 20 overlies and is in abutting engagement with the cylindrical outer surface 136 of the inflator 16.

The resilient deflection of the end portions 150 and 152 of the spring clip 20 away from the central wall 50 of the housing 12 and toward the front-to-rear axis of the air bag module 10 causes the central portion 148 of the spring clip to be urged in the direction 162, that is, toward the central wall of the housing. The central portion 148 of the spring clip 20 thus exerts a biasing force against the inflator 16. This biasing force acts in the direction 162 from the deployment opening 80 toward the central wall 50. This biasing force exerted by the spring clip 20 biases and holds the inflator 16 against the central wall 50 of the housing 12. Specifically, the inflator 16 is held against the inner surface 74 of the rib 70 and against the inner surface 76 of the rib 72.

After the spring clip 20 is connected with the housing 12 to hold the inflator 16 in the housing, an attachment portion 190 (FIG. 2) of the air bag 14 is connected to the housing by known fastening means indicated schematically at 192. The air bag 14 is folded and stored in the chamber 64 in the housing 12, in a known manner. A central portion 194 of the air bag 14 is disposed intermediate the deployment opening 80 and the inflator 16. The central portion 194 of the air bag 14 is thus disposed intermediate the deployment opening 80 and the spring clip 20.

In the event of a vehicle collision, vehicle circuitry (not shown) including a collision sensor actuates the inflator 16 in a known manner. The inflator 16 directs inflation fluid through the fluid outlets 138 into the chamber 64 in the housing 12. The inflation fluid flows into the air bag 14 to move the air bag from the folded and stored condition illustrated in FIG. 2 to an unfolded and inflated condition (not shown) to restrain a vehicle occupant.

The spring clip 20 holds the inflator 16 in place in the housing 12 both prior to and during actuation of the inflator. The biasing effect of the spring clip 20 is sufficient to resist forces on the inflator 16 which would tend to move the inflator relative to the housing 12. The ribs 70 and 72 cooperate with the arcuate central portion 148 of the spring clip 20 to cradle the inflator 16 to prevent the inflator from moving in a vertical direction as viewed in FIG. 2. Because the spring clip 20 is disposed between the folded air bag 14 and the inflator 16, the possibility of disengaging or removing the spring clip after assembly of the air bag module 10 is minimized. When the inflator 16 is actuated, the force of the inflation fluid flowing from the inflator acts in a direction generally away from the central wall 50 of the housing 12. The equal and opposite reaction force on the inflator 16 tends to hold the inflator in position against the central wall of the housing 12.

One spring clip 20 which has been constructed in accordance with the present invention has a thickness (between the front and rear major side surfaces 140 and 142) of about 1 mm and a width (between the minor side surfaces 144 and 146) of about 13 mm. The one spring clip 20 has an overall height (between the terminal sections 178 and 186) of about 89 mm and an overall front-to-rear extent of about 14 mm. The axial distance between the forwardmost portion of the one spring clip 20 and the end surface 180 of the terminal section 178 is about 9 mm. The radius of curvature of the central portion 148 of the one spring clip 20 is 32.5 mm; the radius of curvature of the first curved section 170 is about 7 mm; the radius of curvature of the second curved section 174 is about 27 mm; and the radius of curvature of the third curved section 176 is about 1 mm.

Typical spring clips 20 of the present invention are suitable for use with inflators which have a diameter in the range of from about 50 mm to about 75 mm and an axial length in the range of from about 200 mm to about 300 mm. Spring clips 20 in accordance with the present invention can have a width in the range of from about 10 mm to about 20 mm or more.

FIG. 7 illustrates a portion of an air bag module 200 which is constructed in accordance with a second embodiment of the present invention. The air bag module 200 includes an inflator (not shown), a spring clip 20, and an air bag 14 which are identical to the inflator 16 and the spring clip and the air bag shown in FIGS. 1–6.

The air bag module 200 includes a housing 202 including two separate parts 204 and 206. In this construction, the rear part 204 of the housing 202 supports the air bag 14 and the forward part 206 of the housing supports the inflator 16 and the spring clip 20. The one forward part 206 of the housing 202 can alternatively accommodate a plurality of different rear parts 204 of the housing. The rear parts 204 of the housing 202 can be configured for differently shaped vehicle instrument panels.

A forward edge portion 210 of the rear part 204 of the housing 202 is secured to a rear edge portion 212 of the forward part 206 of the housing by a fastener 214. The fastener 214 is preferably a sheet metal screw. The fastener 214 extends through the forward edge portion 210 of the rear part 204 of the housing 202, through the terminal section 178 of the spring clip 20, and through the rear edge portion 212 of the forward part 206 of the housing. The fastener 214 may also extend through or into a retaining ring (not shown) for the air bag 14. The two parts 204 and 206 of the housing 202 can be assembled together with the spring clip 20 after the spring clip is connected with the forward part of the housing.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle safety apparatus comprising:

a housing having a plurality of walls defining a chamber in said housing, said plurality of walls including first and second opposite side walls and a central wall extending between and interconnecting said first and second side walls, said first and second side walls having portions at least partially defining a deployment opening in said housing opposite said central wall;

an inflatable vehicle occupant restraint in said chamber in said housing between said central wall and said deployment opening;

an inflator in said housing at a location between said inflatable restraint and said central wall; and a spring clip in said housing at a location between said inflator and said inflatable restraint, said spring clip having a first end portion having a snap together fastenerless connection with said first side wall of said housing and a second end portion having a snap together fastenerless connection with said second side wall of said housing and a central portion in abutting engagement with said inflator, said spring clip biasing and holding said inflator against said central wall of said housing.

2. A vehicle safety apparatus as set forth in claim 1 wherein said first and second end portions of said spring clip are resiliently deflected to cause said central portion of said spring clip to hold said inflator against said central wall of said housing.

3. A vehicle safety apparatus as set forth in claim 2 wherein said inflator has a cylindrical outer surface and said central portion of said spring clip has an arcuate configuration overlying said cylindrical outer surface of said inflator.

4. A vehicle safety apparatus as set forth in claim 3 wherein said central portion of said spring clip has a center of curvature coincident with a longitudinal central axis of said inflator, said first and second end portions of said spring clip extending from said central portion in a direction generally radially from said center of curvature.

5. A vehicle safety apparatus as set forth in claim 1 wherein said inflator has a longitudinal central axis and said spring clip has a width in the range of from about 10 mm to about 20 mm as measured in a direction parallel to said axis of said inflator.

6. A vehicle safety apparatus as set forth in claim 5 wherein said inflator has a generally cylindrical configuration, said inflator having a length in the range of from about 200 mm to about 300 mm as measured in a direction along said axis, said inflator having a diameter in the range of from about 50 mm to about 75 mm.

7. A vehicle safety apparatus as set forth in claim 1 wherein said first side wall of said housing includes portions defining an opening in said first side wall extending between said chamber and the exterior of said housing, said first end portion of said spring clip extending through said opening in said first side wall of said housing, said second side wall of said housing including portions defining an opening in said second side wall extending between said chamber and the exterior of said housing, said second end portion of said spring clip extending through said opening in said second side wall of said housing.

8. A vehicle safety apparatus as set forth in claim 7 wherein said portions of said first side wall defining said opening in said first side wall include first and second edge portions spaced apart on opposite sides of said opening, said first edge portion of said first side wall clamping said first end portion of said spring clip against said second edge portion of said first side wall.

9. A vehicle safety apparatus as set forth in claim 1 further comprising a first fastener extending through said first side wall of said housing and said first end portion of said spring clip and securing said first end portion of said spring clip to said first side wall.

10. A vehicle safety apparatus as set forth in claim 1 wherein said central wall of said housing includes a body portion and a plurality of portions projecting from said body portion in a direction toward said deployment opening, said projecting portions of said central wall engaging said inflator and cooperating with said spring clip to hold said inflator in a position spaced apart from said body portion of said central wall.

11. A vehicle safety apparatus as set forth in claim 1 wherein said first and second side walls of said housing extend generally parallel to each other in a first direction between said central wall and said deployment opening, said axis of said inflator extending transverse to said first direction.

12. A vehicle safety apparatus comprising:

a housing having a plurality of walls defining a chamber in said housing, said plurality of walls including first and second opposite side walls and a central wall extending between and interconnecting said first and second side walls, said first and second side walls having portions at least partially defining a deployment opening in said housing opposite said central wall;

an inflatable vehicle occupant restraint stored in said chamber in said housing between said central wall and said deployment opening;

an inflator disposed in said housing at a location between said inflatable restraint and said central wall of said housing; and means for biasing said inflator against said central wall of said housing to hold said inflator in said housing, said means for biasing said inflator comprising a spring clip disposed within said housing at a location between said inflator and said inflatable restraint, said spring clip having a snap fit fastenerless connection with said housing.

13. A vehicle safety apparatus as set forth in claim 12 wherein said spring clip includes first and second end portions and a central portion extending between and interconnecting said first and second end portions, said first end portion of said spring clip being connected with said first side wall of said housing and said second end portion of said spring clip being connected with said second side wall of said housing, said central portion of said spring clip being in abutting engagement with said inflator and biasing said inflator against said central wall of said housing.

14. A vehicle safety apparatus as set forth in claim 12 wherein said inflator has a cylindrical outer surface, said spring clip including an arcuate central portion overlying said cylindrical outer surface of said inflator and opposite end portions biasing said arcuate portion in a direction toward said central wall of said housing.

15. A vehicle safety apparatus as set forth in claim 14 wherein said end portions of said spring clip are engageable with said side walls of said housing and are movable in a direction away from said central wall of said housing relative to said arcuate portion between an undeflected condition and a deflected condition biasing said arcuate portion of said spring clip in a direction toward said central wall of said housing.

16. A vehicle safety apparatus as set forth in claim 15 wherein said end portions of said spring clip are formed as one piece with said arcuate portion of said spring clip and extend from said arcuate portion in a direction generally away from the center of curvature of said arcuate portion.

17. A vehicle safety apparatus as set forth in claim 16 wherein said spring clip comprises a single strip of metal having a width in the range of from about 10 mm to about 20 mm as measured in a direction parallel to an axis of said inflator.

18. A vehicle safety apparatus comprising:

a housing having a plurality of walls defining a chamber in said housing, said plurality of walls including first and second opposite side walls and a central wall extending between and interconnecting said first and second side walls, said first and second side walls having portions at least partially defining a deployment opening in said housing opposite said central wall;

an inflatable vehicle occupant restraint in said chamber in said housing between said central wall and said deployment opening;

an inflator in said housing at a location between said inflatable restraint and said central wall; and a spring clip in said housing at a location between said inflator and said inflatable restraint, said spring clip having a first end portion connected with said first side wall of said housing and a second end portion connected with said second side wall of said housing and a central portion in abutting engagement with said inflator, said spring clip biasing and holding said inflator against said central wall of said housing, said first side wall of said housing including portions defining an opening in said first side wall extending between said chamber and the exterior of said housing, said first end portion of said spring clip extending through said opening in said first side wall of said housing, said second side wall of said housing including portions defining an opening in said second side wall extending between said chamber and the exterior of said housing, said second end portion of said spring clip extending through said opening in said second side wall of said housing.

19. A vehicle safety apparatus as set forth in claim 18 wherein said portions of said first side wall defining said opening in said first side wall include first and second edge portions spaced apart on opposite sides of said opening, said first edge portion of said first side wall clamping said first end portion of said spring clip against said second edge portion of said first side wall.

* * * * *